United States Patent
Fish

(10) Patent No.: US 7,258,828 B2
(45) Date of Patent: Aug. 21, 2007

(54) INFUSION JOINING OF COMPOSITE STRUCTURES

(75) Inventor: John C. Fish, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 93 days.

(21) Appl. No.: 10/933,567

(22) Filed: Sep. 3, 2004

(65) Prior Publication Data

US 2006/0049552 A1   Mar. 9, 2006

(51) Int. Cl.
B29C 63/16 (2006.01)
B29C 70/28 (2006.01)
B29C 70/34 (2006.01)
B64C 3/18 (2006.01)
B64C 1/12 (2006.01)

(52) U.S. Cl. .................. 264/257; 264/258; 264/324; 264/571; 264/510; 264/511; 156/285; 156/286; 156/245

(58) Field of Classification Search ........ 264/510–511, 264/571, 257–258, 324, 251, 261; 156/285, 156/286, 245
See application file for complete search history.

(56) References Cited

U.S. PATENT DOCUMENTS

| 5,593,633 | A  | * | 1/1997 | Dull et al. ................. 264/510 |
| 6,257,858 | B1 | * | 7/2001 | Pabsch et al. ........... 425/129.1 |
| 6,676,882 | B2 | * | 1/2004 | Benson et al. ............. 264/510 |
| 6,702,911 | B2 | * | 3/2004 | Toi et al. ...................... 156/93 |
| 6,718,713 | B2 |   | 4/2004 | McKague, Jr. et al. |
| 6,723,271 | B2 | * | 4/2004 | Hemphill et al. ........... 264/510 |
| 2002/0020934 | A1 | * | 2/2002 | Hinz ......................... 264/40.6 |

* cited by examiner

Primary Examiner—Christina Johnson
Assistant Examiner—Matthew J. Daniels
(74) Attorney, Agent, or Firm—Bracewell & Giuliani LLP

(57) ABSTRACT

A method of joining two components utilizes a fibrous preform at the joint. The preform has two lateral portions and a longitudinally extending flow path. The preform is sandwiched between the two components and enclosed within a vacuum bag. Resin is introduced at an inlet of the flowpath while a vacuum pump creates a suction at an outlet end and along the lateral side edges. The flow path has greater permeability than the remaining portions of the preform, causing the resin to flow to the outlet end. When the resin reaches the outlet end, the suction at the outlet end is reduced, but the suction at the lateral edges remains without reduction to cause the resin to flow laterally into the preform.

20 Claims, 2 Drawing Sheets

INFUSION JOINING OF COMPOSITE STRUCTURES

FIELD OF THE INVENTION

This invention relates in general to joining fiber and resin composite structures, and in particular to a method using a fibrous preform between the components that is infused with resin after the components are placed against the preform.

BACKGROUND OF THE INVENTION

Composite structures formed of resin and fibers such as glass, aramid or carbon are used in many industries because of light weight and strength. A number of methods exist for forming composite structures. In one method, composite components are formed and pre-cured, then secured together. One method of securing the components is by the use of adhesive, which saves cost and weight as compared to drilling holes and mechanically attaching the components. Components may also be co-cured and bonded to each other at the same time, but co-curing requires tooling that holds the uncured components in position.

Process sensitivity and quality assurance issues have limited the use of adhesive bonding of pre-cured composites in some applications, such as in aerospace. These issues include sensitivity to surface preparation, bond line thickness, pressure distribution, moisture, and time-temperature curing profiles. In particular, the application of adhesive bonding on large composite structures has proven to be difficult for a number of reasons, as follows:

1. insuring uniform pressure application over large bonded areas;
2. insuring that no voids or bridged areas exist along the bond line;
3. demonstrating that variations in bond line thickness, which are characteristic of the interface between large structures, are acceptable; and
4. properly applying the adhesive on the large areas to be bonded in a timely and consistent manner to insure producibility from part to part.

One known technique uses a preform between the two components to be joined. A preform is a fabric member that may be woven or nonwoven. Normally, the preform is impregnated initially with a resin, but it will be in an uncured state. An adhesive film may be placed between the preform and each of the pre-cured components. Pressure and heat are applied to cure the preform and bond the components together. The pressure may be applied by vacuum bagging techniques. The preform has a thickness that causes it to compress under the pressure.

SUMMARY OF THE INVENTION

In this invention, a preform of composite material is utilized. The preform is a fabric member that locates between two components to be joined before the preform is infused with resin. The preform has a thickness such that it can conform to variable thicknesses and adjust to local manufacturing tolerances. For example, the preform may be non-woven fibrous material or felt. The preform has a flow path extending through it with an inlet and an outlet. The flow path has a greater permeability than the remaining portions of the preform.

After the preform is placed between the first and second components, the preform and at least portions of the components are placed within a vacuum bag. A resin source connected to the inlet supplies resin to the flow path. A vacuum source at the outlet of the flow path creates suction to cause the resin to flow along the flow path. Preferably, lateral outlets are located along the sides of the preform to induce resin flow from the flow path laterally outward into the preform. After the preform has been properly infused with resin, the resin is cured, thereby bonding the first and second components to each other.

In one embodiment, the preform has flaps along each lateral side. The first component is placed in contact with the preform between the flaps. The flaps are then folded over onto portions of the first component prior to the vacuum bag step.

DETAILED DESCRIPTION OF THE INVENTION

Figure 1:
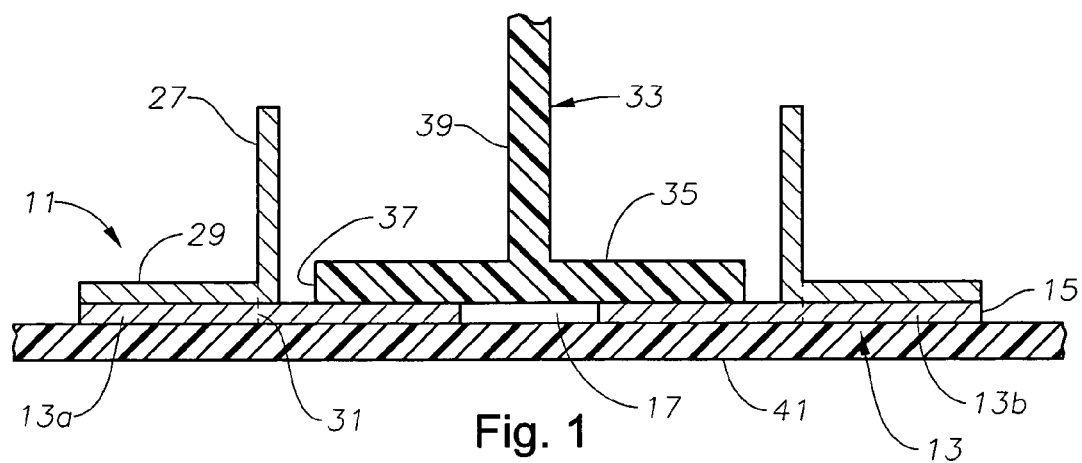
FIG. 1 is a sectional view a preform with a first embodiment of a flow path and shown in one stage of a method in accordance with this invention.

Referring to FIG. 1, a fiber preform 11 is shown. Preform 11 is a fabric, preferably of a non-woven or fibrous material, such as felt, but woven material are also feasible. Preferably, preform 11 is free of resin at the point in the method shown in FIG. 1. Preform 11 has a base 13 that has two lateral portions 13a, 13b. Each lateral portion 13a, 13b has a side edge 15.

Preform 11 has a flow path 17, which in FIG. 1 comprises an open gap between lateral portions 13a, 13b. In this embodiment, flow path 17 extends in a straight line parallel to lateral side edges 15. Flow path 17 extends from one end of base 13 to the other.

Figure 2:
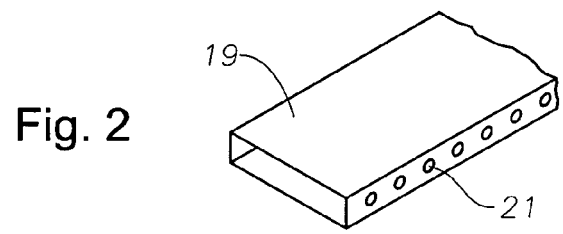
FIG. 2 is a sectional view illustrating a second embodiment of the flow path of the preform of FIG. 1.

As shown in FIG. 2, flow path 17 (FIG. 1) could alternately comprise a conduit 19 or tube of a variety of materials. Tube 19 is shown with perforations 21 along the side edges to enable lateral outward flow of resin from the hollow interior of conduit 19. Rather than perforations 21, conduit 19 could be made of porous material that freely allows the flow of resin through its sidewalls. Tube 19 is preferably secured to lateral portions 13a, 13b, or it may be imbedded within base 13 or located in a channel (not shown) in base 13.

Figure 3:
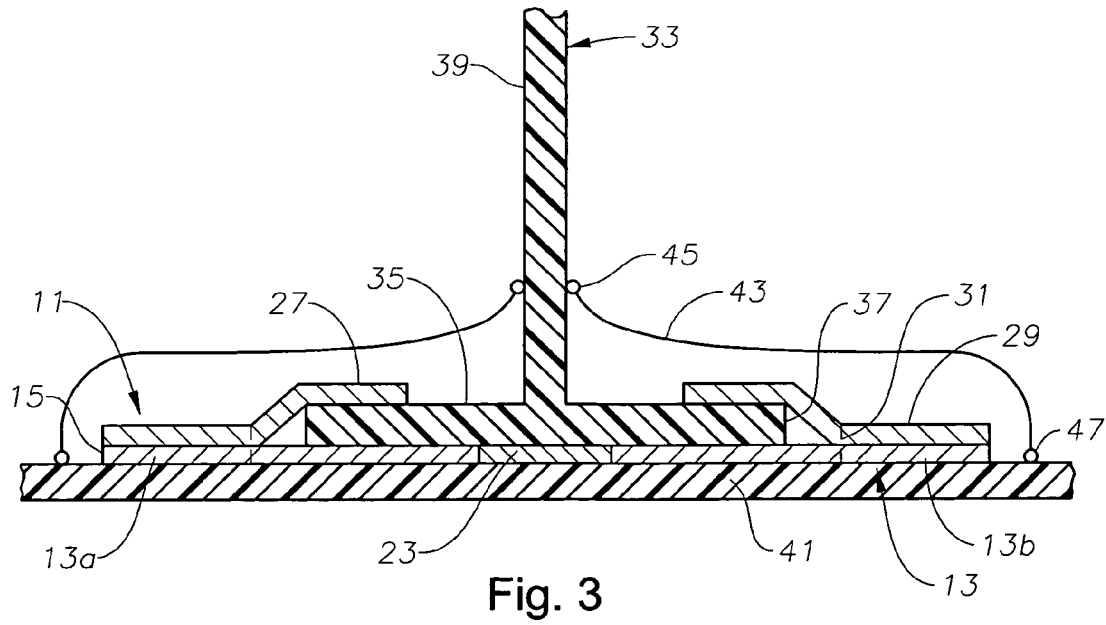
FIG. 3 is a schematic sectional view illustrating another step of the method of this invention, and with a preform having a third embodiment of a flow path.

The flow path could also be made of a fabric, such as flow path 23 in FIG. 3. Flow path 23 is formed of fibrous material that has a greater permeability than base 13. In FIG. 3, the thickness of flow path 23 is the same as the thickness of base 13, but the fibers contained therein are fewer in number or smaller in diameter to provide less resistance to resin flow than base portions 13a, 13b. Flow path 23 is located in the same plane as base portions 13a, 13b. Preferably flow path 23 is joined to base lateral portions 13a, 13b by stitching, weaving or adhesives.

Figure 4:
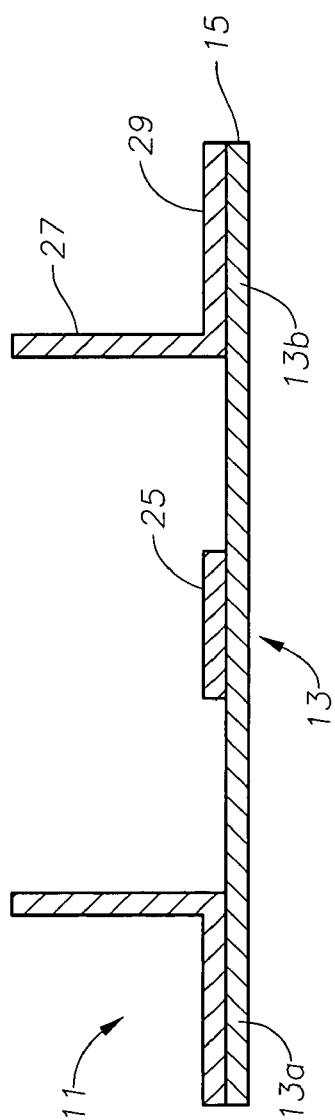
FIG. 4 is a sectional view of a preform having a fourth embodiment of a flow path.

In FIG. 4, flow path 25 is also preferably a fabric similar to flow path 23 (FIG. 3). However, base portions 13a, 13b join each other, and flow path 25 is shown on top of base 13.

Alternately, flow path 25 could be within a groove or channel (not shown) formed in base 13 or embedded within base 13. Whether the flow path is gap 17 (FIG. 1), tube 19 (FIG. 2), in-plane fabric strip 23 (FIG. 3), or out-of-plane fabric strip 25, the resistance to flow of resin is less than in base 13.

Referring again to FIG. 1, base 13 preferably has a pair of wings or flaps 27 that are laterally spaced apart from each and on opposite side edges of flow path 17. Each flap 27 is located on one of the lateral portions 13a, 13b. Each flap 27 is a rectangular strip of fabric that may be the same type and thickness as base 13 or different. Each flap 27 has a stationary portion 29 that overlies one of the base portions 13a or 13b and is preferably stitched to base 13 by stitching 31. Each flap 27 is flexible relative to its stationary portion 29 so that it can be folded generally upright or 90 degrees relative to stationary portion 29. Flaps 27 are also preferably free of resin in the step shown in FIG. 1.

In FIG. 1, a first component 33 is shown resting on the upper surface of base 13. In this example, first component 33 comprises a spar such as used for an aircraft wing. Spar 33 has a flange 35 on its lower side. Flange 35 is flat and has lateral side edges 37 in this embodiment. Lateral side edges 37 are spaced inward from flaps 27 in the step shown in FIG. 1. Spar 33 also has a web 39 that extends at 90 degrees relative to flange 35. An upper flange 40 (FIG. 5) may be located on the upper end of web 39 parallel to flange 35. Web 39 is preferably centered over flow path 17. Preferably first component 33 is of a composite resin and fiber material that has been cured prior to placing it on preform 11, but it alternately could be a metal.

The opposite or lower side of base 13 is in contact with a second component 41. Second component 41 is also preferably a pre-cured composite structure, but it could be of another material such as metal. Second component 41 may comprise a skin of a wing, for example. Flange 35 and skin 41 define upper and lower sides for flow path 17.

In FIG. 3, a technician has folded flaps 27 downward so that each flap 27 overlies a portion of the upper side of spar flange 35. Also, the technician has installed a vacuum bag assembly 43. Vacuum bag assembly 43 comprises one or more sheets of flexible plastic film that are arranged to form an airtight enclosure around preform 11. In this embodiment, two edges of vacuum bag assembly 43 are secured by sealant tape 45 to web 39. Two other edges are secured by sealant tape 47 to skin 41 outward from preform lateral edges 15. Vacuum bag assembly 43 also has end portions that extend around each longitudinal end of spar 33. Because spar 33 and skin 41 are pre-cured, they are impermeable and substantially airtight, thus there is no need for enclosing them entirely within vacuum bag assembly 43. If the two components to be joined were small enough, the entire assembly could be enclosed within a vacuum bag.

Figure 5:
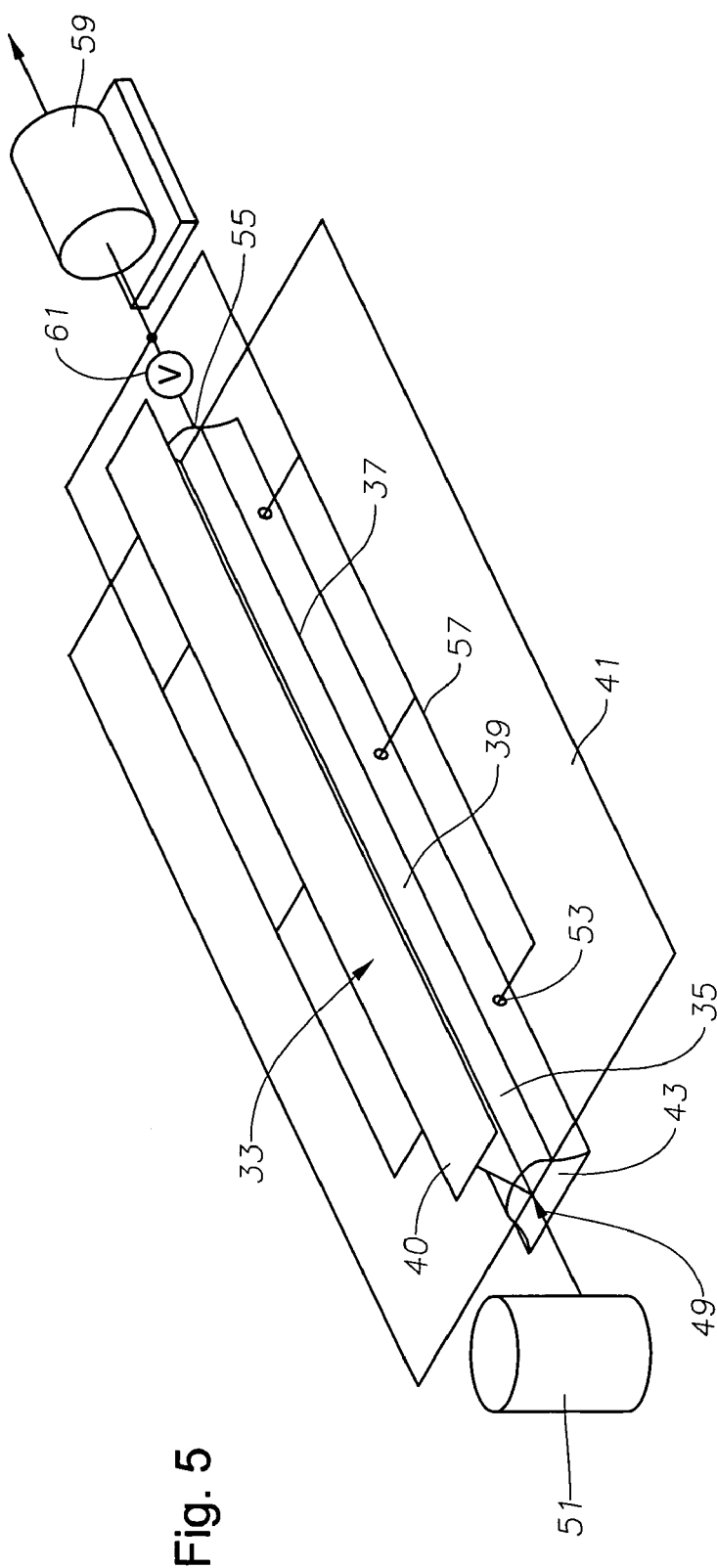
FIG. 5 is a perspective view illustrating another step of the method of this invention.

Referring to FIG. 5, a technician provides an inlet port 49 at one longitudinal end of vacuum bag assembly 43. Inlet port 49 communicates with one end of flow path 17 (or flow paths 19, 23 or 25 if one of those is utilized). A resin source 51, which comprises a container containing a liquid resin, connects to inlet port 49. The technician also connects one or more lateral outlet ports 53 to vacuum bag assembly 43 along the lateral edges of spar 33. In this example, three outlet ports 53 are located along each lateral side of spar 33. Also, an end outlet port 55 with a valve 61 locates on an end of spar 33 opposite from inlet port 49. End outlet port 55 communicates with the opposite end of flow path 17. A series of tubes 57 extend from a vacuum pump 59 to each of the outlet ports 53 and to valve 61. Inlet and outlet ports 49, 53 and 55 communicate with the interior of vacuum bag 43, but need not be physically joined to any portion of preform 11.

The operator turns on vacuum pump 59 and opens valve 61, causing air to be withdrawn from vacuum bag 43 as well as from flow path 17 (FIG. 1). The suction created at valve 61 causes resin to flow from resin source 51 through inlet port 49 and along flow path 17 (FIG. 1). Because the permeability of flow path 17 is greater than the permeability of base portions 13a, 13b (FIG. 1), the resin will flow more readily toward end outlet port 55 than laterally outward into preform lateral portions 13a, 13b (FIG. 1.) When the resin nears end outlet port 55 of flow path 17 (FIG. 1), the technician closes valve 61 or at least substantially reduces the air flow through valve 61. The suction created by vacuum pump 59 continues at lateral outlet ports 53, inducing resin flow from flow path 17 laterally outward through base lateral portions 13a, 13b (FIG. 1). The resin also flows into and infuses flaps 27 (FIG. 3).

Because spar 33 and skin 41 are pre-cured, resin does not flow into these components. Vacuum bag assembly 43 collapses on the components and applies pressure that causes spar 39 to move more closely toward skin 41, compressing the thickness of base 11. If flow path 25 of FIG. 4 is utilized, rather than flow paths 17 (FIG. 1), 19 (FIG. 2) or 23 (FIG. 3), the vacuum pressure will cause flow path 25 to compress and to compress portions of base 13 so that after evacuation, flow path 25 will be substantially flush with the upper surface of preform base 11.

After preform 11 is entirely infused with resin, the resin flow is stopped by stopping vacuum pump 59 or by closing a valve (not shown) at inlet port 49. The resin within preform 11 is then allowed to cure, preferably while still under a vacuum, at an appropriate temperature to consolidate and strengthen the assembly. Once cured, vacuum bag 43 can be removed. Preferably, heat is also applied during the curing process or during the resin infusion step.

The invention has significant advantages. Since the preform is not pre-impregnated with resin initially, there is no issue related to whether the preform is still within its shelf life. Because of its thickness, the preform of this invention will conform to fabrication and assembly tolerances associated with the components to be joined. The resin infusion process is easy to implement and clearly establishes that all joint surfaces have been infiltrated with resin. Being of fibrous material, the preform forms a composite once the resin has cured, providing a stronger joint than joints that are bonded with only adhesive. Tooling and processing requirements are less intensive than those required for co-curing or co-bonding. The infusion joining process has a potential for a higher degree of repeatability or producibility as compared to other joining methods.

While the invention has been shown in only a few of its forms, it should be apparent to those skilled in the art that it is not so limited but is susceptible to various changes without departing from the scope of the invention. For example, if desired, suction at the lateral outlets could be delayed until the resin reaches the end outlet.

The invention claimed is:

1. A method of joining a first component to a second component, wherein the first and second components being a cured resin and fiber composite or a metal, each having a cured or metal portion, the method comprising:

(a) placing a preform of composite material on the cured or metal portion of the second component, the preform having a flowpath with an inlet and an outlet, the flowpath having a greater permeability than remaining portions of the preform;

(b) placing the cured or metal portion of the first component on the preform on a side opposite the cured or metal portion of the second component; then (c) placing the preform and at least the cured or metal portions of the first and second components within a vacuum bag assembly, thereby sandwiching the preform between the cured or metal portions of the first and second components; then (d) introducing resin into the inlet of the flowpath and creating a suction at the outlet of the flowpath, causing resin to flow along the flowpath and from the flowpath into the preform to infuse the preform with resin; then (e) curing the resin in the preform to bond the cured or metal portion of the first component to the cured or metal portion of the second component to thereby join the first and second components.

2. The method according to claim 1, wherein step (d) further comprises creating suction in the vacuum bag assembly along lateral edges of the preform, causing resin to flow in lateral directions from the flowpath into the preform.

3. The method according to claim 2, wherein step (d) further comprises reducing the suction at the outlet of the flowpath after the resin substantially reaches the outlet of the flowpath, and continuing to apply the suction without reduction along the lateral edges of the preform.

4. The method according to claim 1, wherein step (a) comprises placing right and left portions of the preform adjacent to each other and separated by a gap to define the flowpath.

5. The method according to claim 1, wherein step (a) comprises forming the flowpath with a perforated conduit.

6. The method according to claim 1, wherein step (a) comprises forming the flowpath with a fabric strip attached between right and left portions of the preform.

7. The method according to claim 1, wherein step (a) comprises placing a fabric strip on the preform to define the flowpath.

8. The method according to claim 1, wherein:
step (a) further comprises providing the preform with flaps on opposite lateral edges of the preform, the flowpath extending between the flaps;
step (b) comprises folding at least portions of the flaps over at least the cured or metal portion of the first component; and
step (d) further comprises causing resin to flow from the flowpath into the flaps to infuse the flaps with resin.

9. The method according to claim 1, wherein in step (a) the composite material of the preform is free of resin.

10. A method of joining a first component to a second component, the first and second components being formed of cured resin and fiber composite material, and the first component further being an elongated member having a flange with lateral side edges and a web extending from the flange between the lateral side edges, the method comprising:

(a) placing a preform of composite material on the second component, the preform having a flowpath extending longitudinally from one longitudinal end of the preform to an opposite longitudinal end of the preform, the flowpath having lesser resistance to fluid flow than adjoining-portions of the preform;

(b) placing the flange of the first component on the preform on a side opposite the second component, thereby sandwiching the preform between the first and second components; then (c) placing within a vacuum bag assembly the preform, at least a portion of the second component, the flange, and at least a portion of the web of the first component;

(d) providing an inlet port in the vacuum bag assembly at one of the ends of the preform, an end outlet port at the other of the ends of the preform and lateral outlet ports along lateral side edges of the preform;

(e) introducing resin through the inlet port into the flowpath and creating a suction at the end outlet port, causing resin to flow along the flowpath toward the end outlet port, and when the resin substantially reaches the end outlet port, reducing the suction at the end outlet port;

(f) creating suction at the lateral outlet ports, causing resin to flow laterally from the flowpath into the preform until the preform is substantially infused with resin; then (g) curing the resin in the preform to bond the first component to the the second component.

11. The method according to claim 10, wherein the suction of step (f) continues without reduction after the suction at the end outlet port is reduced.

12. The method according to claim 10, wherein step (a) comprises separating lateral portions of the preform by a gap to define the flowpath.

13. The method according to claim 10, wherein step (a) comprises forming the flowpath with a perforated conduit.

14. The method according to claim 10, wherein step (a) comprises forming the flowpath with a fabric strip attached between lateral portions of the preform.

15. The method according to claim 10, wherein step (a) comprises placing a fabric strip on the preform to define the flowpath.

16. The method according to claim 10, wherein:
step (a) further comprises providing the preform with laterally spaced apart flaps;
step (b) comprises folding at least portions of the flaps over at least portions of the flange of the first component; and
step (e) further comprises causing resin to flow from the flowpath into the flaps to infuse the flaps with resin.

17. The method according to claim 10, wherein in step (a) the composite material of the preform is free of resin.

18. The method according to claim 10, wherein step (a) comprises extending the flowpath in a straight line from one of the ends to the other of the ends of the preform.

19. A method of joining a first component to a second component, the first component being an elongated member having a flange with lateral side edges and a web extending from the flange between the lateral side edges, the method comprising:

(a) providing a preform of permeable composite fiber material, the preform having a base and a pair of laterally spaced apart flaps extending from the base;

(b) placing the base of the preform on the second component;

(b) placing the flange of the first component on the base of the preform between the flaps and on a side opposite the second component, then folding the flaps over onto the flange; then (c) placing within a vacuum bag assembly the preform, at least a portion of the second component, the flange, and at least a portion of the web of the first component;

(d) providing an inlet port in the vacuum bag assembly at one end of the first component and providing outlet ports in the vacuum bag assembly along lateral side edges of the preform and at another end of the first component;

(e) introducing resin through the inlet port and creating a suction at the outlet ports of the vacuum bag assembly, causing resin to flow into the preform to infuse the preform with resin; then (f) curing the resin in the preform to bond the first component to the second component.

20. The method according to claim 19, wherein the flaps comprise strips of composite material secured to the base of the preform by stitching.

* * * * *